Oct. 26, 1937.   E. F. NELSON   2,096,820
TREATMENT OF HYDROCARBON OILS
Filed Aug. 14, 1933
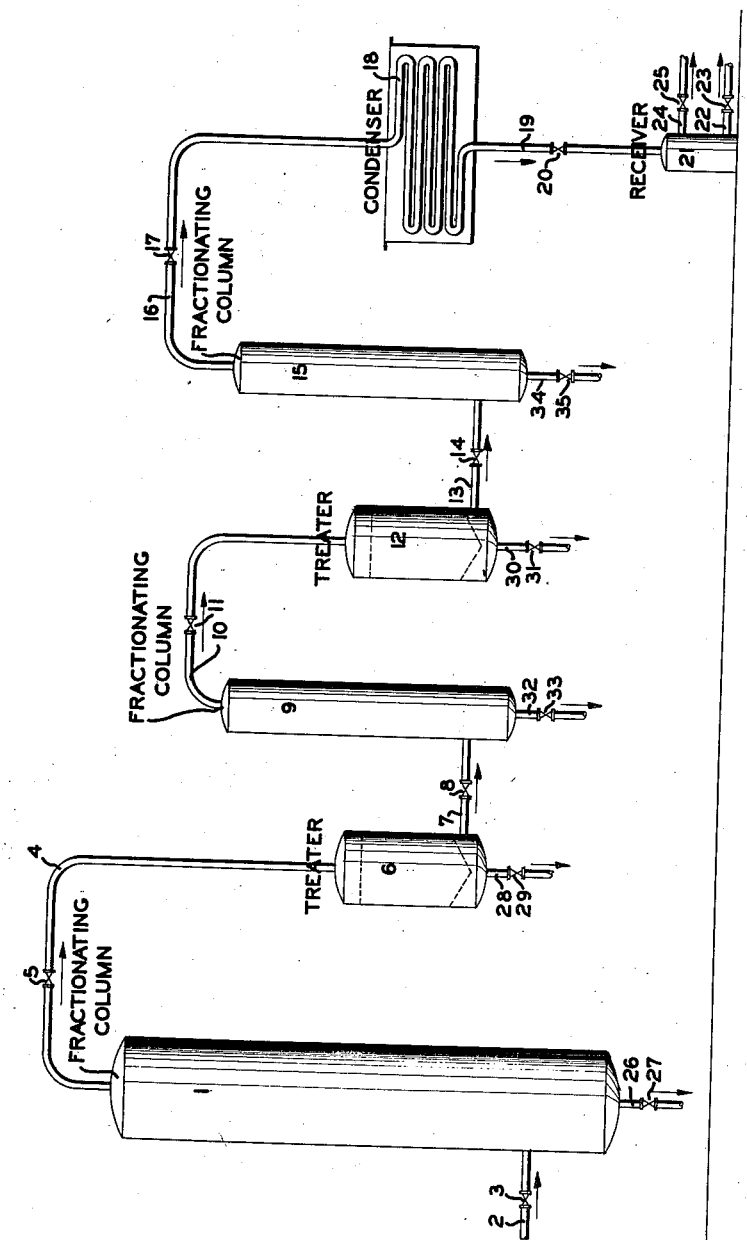
INVENTOR
EDWIN F. NELSON
BY Frank L. Belknap
ATTORNEY Patented Oct. 26, 1937

2,096,820

UNITED STATES PATENT OFFICE 2,096,820

TREATMENT OF HYDROCARBON OILS

Edwin F. Nelson, Chicago, Ill., assignor to Universal Oil Products Company, Chicago, Ill., a corporation of Delaware Application August 14, 1933, Serial No. 685,065

1 Claim. (Cl. 196—96)

This application is a continuation in part of my application Serial No. 490,471, filed October 22, 1930.

This invention relates more particularly to improvements in treating fractionated hydrocarbon vapors.

The present invention provides a method for the treatment of hydrocarbon vapors from any distilling system, particularly systems from which motor fuel forms the main or one of the major finished products, and is especially adaptable for use with cracking systems in which the vapors are fractionated and subsequently treated to produce motor fuel.

Specifically the invention comprises treating fractionated hydrocarbon vapors in successive treating elements where they are subjected to the treating action of finely divided adsorbent materials such as contact clays, fuller's earth and the like and subjecting said vapors to fractionation following each successive treating stage.

Among the advantages of the present invention may be mentioned the following. In the treatment of the hydrocarbon vapors, particularly cracked hydrocarbons, with adsorbent material such as fuller's earth, the more highly unsaturated hydrocarbons are polymerized to form gum and resin-like materials and in addition, polymerization reactions are initiated causing the formation of higher boiling more or less unstable material. It is also desirable to remove the polymers formed as quickly as possible since the adsorbent earth becomes less efficient when coated with the polymers and nothing further is to be gained by a continued contact of the polymers with the earth. This is accomplished by the repeated and successive treatments and fractionations such as are described in connection with the present invention. Another result of the invention is the improvement of the quality of the product and the yield by relatively short time contact of the vapors undergoing treatment with the adsorbent earth or clay, the polymerization products, gums and resins being formed being separated after each stage of treatment as well as in the subsequent fractionations and in addition the unstable intermediate products of the treatment are removed during the fractionation steps. Specifically, the fractionation following the treating step completes the removal of deleterious polymers or intermediate products thereof from the vapors before they are subjected to the succeeding treatment with the clay. This results not only in an improved product and yield but in the prolonged life of the adsorbent earth or clay before regeneration is required and a longer cycle of treatment with the resultant economies.

In the single drawing a diagrammatic view of one form of apparatus suitable for carrying out my invention is shown.

Referring more in detail to the drawing, 1 indicates a fractionating column which may be part of a distilling system or a cracking system from which hydrocarbon vapors to be treated are supplied to column 1 through line 2 and valve 3. Fractionated vapors from column 1 pass through line 4 and valve 5 and are subjected to treatment in treater 6 where they come in contact with adsorbent treating material such as contact clays or fuller's earth or any other suitable material, thence passing through line 7 and valve 8 to fractionating column 9. The vapors are subjected to fractionation in column 9 primarily for the purpose of separating gum forming or other deleterious polymerization products from the desired products. The partially treated vapors then pass through line 10 and valve 11 to further treatment in treater 12 in which the vapors are subjected to further treatment of the same nature as that obtained in treater 6. Vapors from treater 12 pass through line 13 and valve 14 to be subjected to further fractionation in fractionating column 15 to effect the separation of polymerization products or any other harmful materials from the vapors. The finally treated vapors from fractionating column 15 may pass through line 16 and valve 17 to condenser 18 where they are subjected to condensation and cooling, the products passing through line 19 and valve 20 to be collected in receiver 21. Condensed distillate may be withdrawn from receiver 21 through line 22 and valve 23. Uncondensed vapors and gas may be released from the receiver through line 24, controlled by valve 25.

Reflux condensate from fractionating column 1 may be withdrawn through line 26, controlled by valve 27, and in case the system is operated in conjunction with a cracking process this reflux condensate may preferably be recycled to the cracking system for reconversion. Heavy polymerization products and the like formed within treaters 6 and 12 may be removed therefrom through line 28, controlled by valve 29, and line 30, controlled by valve 31, respectively. Heavy gum forming polymerization products and other deleterious materials separated from the vapors in fractionating columns 9 and 15 are removed from the respective zones through line 32, controlled by valve 33 and line 34, controlled by valve 35. Liquid withdrawn from any or all of the zones 6, 9, 12 and 15 through the respective lines 28, 32, 30 and 34 may be isolated from the system or, if the system is operated in conjunction with a cracking process may, if desired, be returned to any desired portion of the cracking system for further treatment and/or reconversion. For example, any or all of these products may be returned by well known means (not shown) to fractionating column 1, there combining with the reflux condensate and passing therewith through line 26 and valve 27 to the heating element of the cracking system for reconversion.

It will be understood that any of the various well known forms of fractionating devices such as packed or bubble towers, columns with perforated pans or the like may be employed for the fractionating columns 1, 9 and 15 and that any well known form of treating element capable of performing the desired functions may be utilized for treaters 6 and 12. It will also be understood that the same form or different forms of apparatus may be used for the various fractionating devices and treaters of the system. The exact form or construction of the various elements of the system is not a part of the present invention as it is not desirable to so limit its broad spirit and scope.

Although two treating stages following fractionating column 1 are illustrated and described a greater number of similar treating stages may be used and may be followed, if desired, by subsequent treating methods applied to either the vapors or the distillate condensed therefrom, or both. Subsequent treating methods of a different nature do not, however, form any part of the present invention except in combination.

As a specific example of the operation of the process of the present invention, cracked vapors containing a substantial percentage of material boiling within the range of motor fuel are subjected to fractionation in column 1 and practically all of the heavier constituents of the vapors boiling above the range of motor fuel are condensed and separated from the lighter vapors. The light fractionated vapors containing some 600 mgm. of gum per 100 cc. as determined by the copper dish method, are then subjected to treatment in treater 6 where they are contacted with the good quality adsorbent earth or clay of about 60 to 120 mesh, are thence subjected to fractionation in column 9 and passed in treater 12 through a bed of about 60 mesh fuller's earth. The mesh of the earth may vary, of course. The vapors from treater 12 are then subjected to final fractionation in column 15 and thereafter condensed and collected. Further stages of treatment may also be employed. The treated product showed a marked improvement in color stability and odor after exposure to sunlight as compared with a sample of the material leaving column 1, or which has been subjected to a single treatment only. The gum content was reduced to approximately 8 mgm. per 100 cc. with a color of plus 30 Saybolt and only about one point drop in color on exposure to the arc or sunlight in the usual color stability test, and the end boiling point of the material is lowered by about 10° F. over that leaving fractionating column 1. The yield of product within the boiling range of motor fuel is increased, as is also the life of the clay and the cycle of treatment, compared with single stage treatment and fractionation only.

I claim as my invention:

In the refining of hydrocarbon vapors by treatment with adsorbent earth, the process which comprises passing fractionated vapors through a body of adsorbent earth of relatively fine mesh, fractionating the vapors out of contact with adsorbent material thereby condensing a portion of the vapors and separating said condensate and deleterious polymerization products from the vapors, passing the separated vapors through a body of adsorbent earth of coarser mesh than said first mentioned body, subjecting the vapors to final fractionation and condensing the resulting separated vapors as a final product of the process.

EDWIN F. NELSON.